March 15, 1938. H. TETRAULT 2,111,341
TOWING APPARATUS
Filed Jan. 23, 1937 3 Sheets-Sheet 1

Inventor:
Hector Tetrault,
By: Lee J. Gary
Attorney

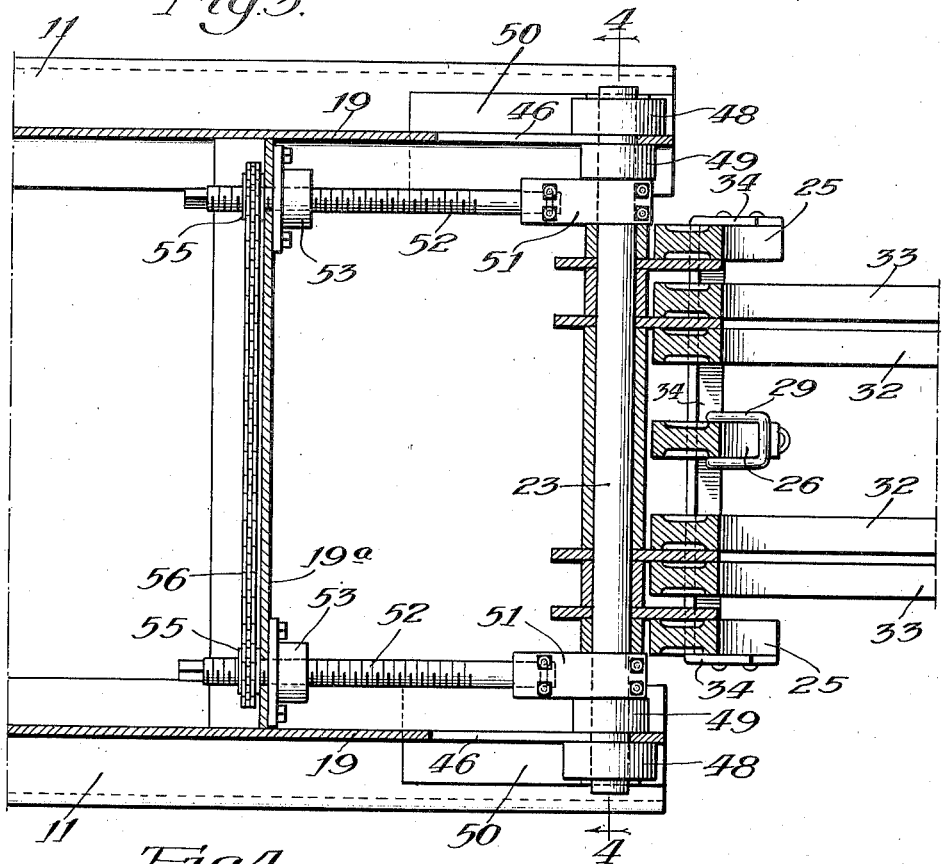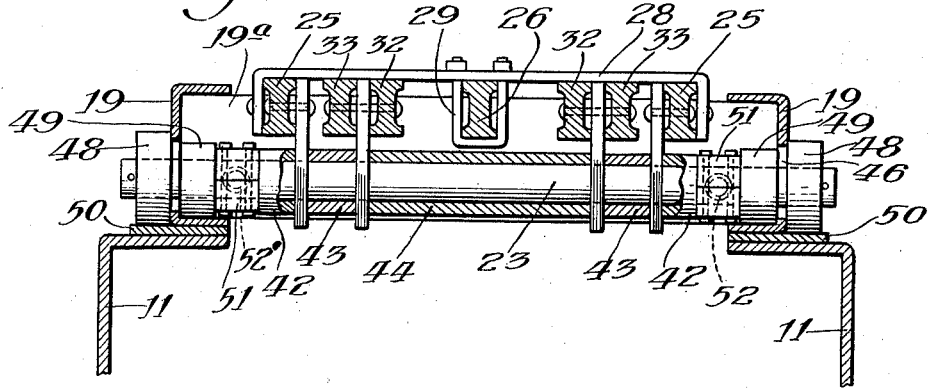

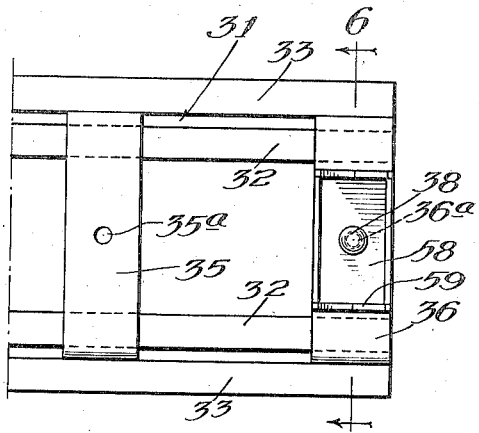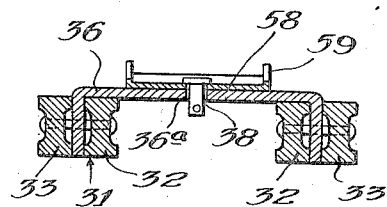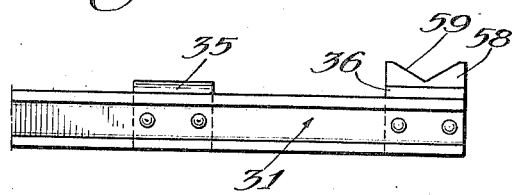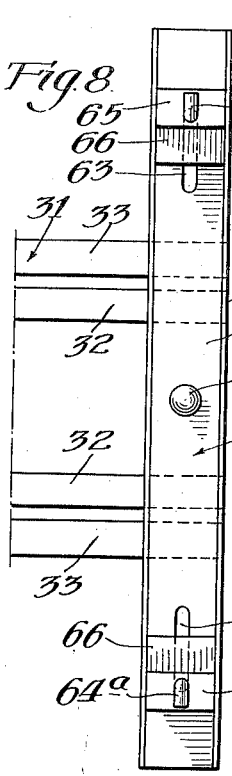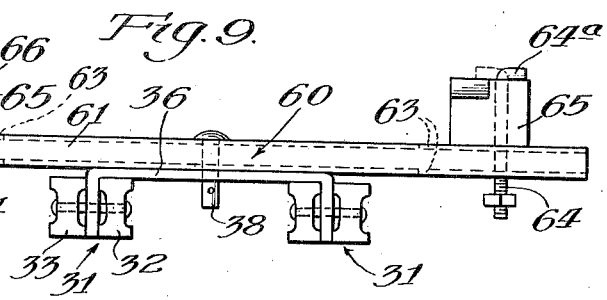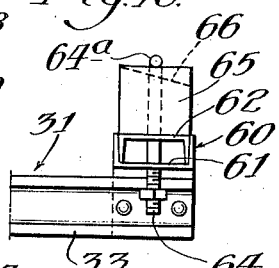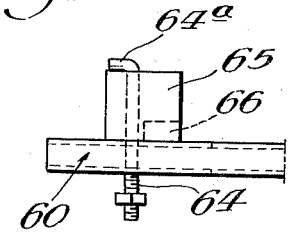

Patented Mar. 15, 1938

2,111,341

UNITED STATES PATENT OFFICE 2,111,341

TOWING APPARATUS

Hector Tetrault, Bourbonnais, Ill.

Application January 23, 1937, Serial No. 121,926

10 Claims. (Cl. 214—86)

This invention relates to apparatus for towing vehicles, such as passenger automobiles and trucks, and more particularly the present invention is directed to towing apparatus of the type mounted on a vehicle and provided with means for elevating and supporting one end of the towed vehicle while the opposite end thereof is supported by its running gear on the ground.

Due to present-day requirements of speed and economy in operation of towing vehicles there is a tendency toward greater use of light weight towing vehicles. In most instances the hoisting apparatus is usually so mounted on such vehicles that the assumed load of the vehicle being towed is imparted to the overhanging rear end of the chassis of the towing vehicle with the result that frequently the load is so great that there is a substantial counterbalancing of the weight of the towing vehicle, forwardly of the rear wheels. This results in making it difficult to steer the towing vehicle, as well as being hazardous.

One of the objects of the present invention resides in the provision of novel and improved towing apparatus which obviates the foregoing difficulties by the provision of means for shifting the assumed load of the towed vehicle closer to the rear wheels of the towing vehicle.

Another object is to provide improved apparatus of the character indicated which is adapted for quick and easy engagement of the front axle of the towed vehicle for raising and supporting the front end thereof without possibility of marring the vehicle, or in any way damaging or straining parts of said towed vehicle.

A further object of this invention is to provide novel means for quick, positive engagement with the rear end of practically all types of vehicles for raising and supporting it for towing, without damaging the same.

Still another object resides in the provision of improved towing apparatus wherein the hoisting boom is constructed so as to be collapsed and disposed substantially within the chassis of the towing vehicle, so as to occupy a minimum of space.

And a still further object is to provide an improved construction of towing apparatus of the character indicated which is simple, strong, positive in operation and capable of economical manufacture.

Other objects and advantages will appear in the following description taken in connection with the accompanying drawings in which:

Fig. 3 is a horizontal sectional view through the pivot support for the boom, taken at line 3—3 on Fig. 1.

Fig. 4 is a transverse sectional view taken at line 4—4 on Fig. 3.

Fig. 5 is a plan view of the lower end of the boom with attachment for use in connection with front axle of vehicle to be towed.

Fig. 6 is a transverse section through the extreme lower end of the boom, taken at line 6—6 on Fig. 5.

Fig. 7 is a side elevation of the lower end of the boom.

Fig. 8 is a plan view of the lower end of the boom with attachment for use in connection with the rear end of a vehicle to be towed.

Fig. 9 is an end elevation of the lower end of the boom and attachment shown in Fig. 8.

Fig. 10 is a side elevation of the lower end of the boom with the attachment shown in Fig. 8.

Fig. 11 is a partial end elevation, similar to Fig. 9, showing a different position of adjustment of the supporting blocks for adaptation for use in connection with vehicles having a single transverse leaf spring for supporting rear end of said vehicle.

Figure 1:
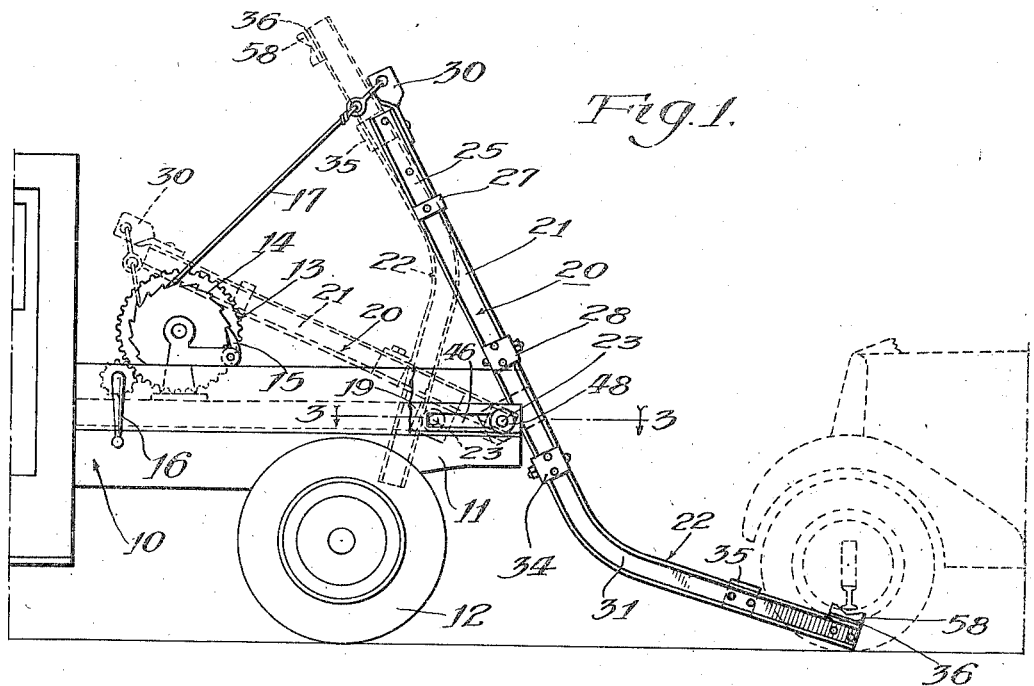
Fig. 1 is a side elevation of the rear end of a towing vehicle provided with towing apparatus constituting the present invention, with the boom disposed in lowered position ready for engagement beneath the front axle of a vehicle to be towed.

The construction embodying the present invention represents certain novel refinements and improvements in towing apparatus disclosed in my copending application Serial No. 21,270, filed May 13, 1935, now Patent No. 2,067,954, dated Jan. 19, 1937, of which this is a continuation-in-part.

For purpose of illustration I have shown in the drawings the rear end of a towing vehicle, indicated at 10, and which may be understood to be of conventional form, including a chassis 11 and rear supporting wheels 12. Mounted on the floor supported on the chassis, forwardly of the rear wheels is a winch 13, preferably of the hand operated type, including usual gearing, a ratchet wheel 14, and detent pawl 15, for retaining the winch drum in a desired position of adjustment. A hand crank 16, is operatively connected to the gearing for rotating the winch drum around which a flexible cable 17, is wound.

The vehicle chassis 11, includes an auxiliary frame 19, preferably terminating flush with the rear end of the chassis, preferably centrally thereof, is a collapsible boom 20 pivotally supported on a horizontal pivot axis, and normally disposed, when in operative position, as seen in Fig. 1, in a downwardly oblique rearwardly extending direction with the lower end extending in close proximity to the ground for movement beneath the end of a vehicle to be towed. Said boom is composed of an upper section 21, and lower section 22, which desirably, as shown in the drawings, though not essentially so, are pivotally mounted for swinging about the same transverse horizontal axis of a pivot shaft 23. Said boom sections 21 and 22, as will be presently described, are constructed for interlocking engagement, when disposed in operative position, to constitute a single, rigid boom for elevating and sustaining the load of one end of a vehicle to be towed, as may be seen in Fig. 2.

The upper boom section 21, includes a pair of straight transaxially spaced beams, 25, the upper ends of which converge and embrace a centrally disposed beam 26. The upper ends of said beams are rigidly connected by a U-shape clamp plate 27, and the intermediate portions of said beams are secured in spaced relation by a U-shaped clamp plate 28, extending over the beams and having the legs thereof riveted to the beams 25, while the beam 26 is secured to said plate by a U-bolt 29. This plate in adidtion to serving as a connecting and bracing member, also serves as a stop for limiting the pivotal movement in one direction of the lower boom section 22, relatively to the upper boom section 21. The extreme upper end of said upper boom section is provided with an eyelet fixture 30, for connection to the free end of the flexible cable 17, while the lower ends of said beams 25 and 26 extend a substantial distance below and rearwardly of said pivot shaft 23, as clearly disclosed in said copending application.

The lower boom section 22 includes two transversely spaced apart parallel beams 31, each composed of two closely disposed beams 32 and 33, the upper portions of which are straight and are adapted to be disposed in alignment with beams 25 and 26 to form a continuous boom, when the upper ends of said beams 31, encounter the underside of the clamp plate 28, while portions of said beams 31, below the pivot axis engage and are supported on the plate 34 connecting the lower ends of the beams 25 and beam 26, the latter being connected by a U-bolt 29. The lower portions of the beams 31 are bent at an obtuse angle to the upper portion so that when the boom is employed in supporting the end of a vehicle to be towed, said lower portion extends substantially horizontal to make it convenient to get under various projections of present designs of vehicles. Said lower ends of the beams 31 are rigidly connected together by two longitudinally spaced apart plates 35 and 36 having down turned ends riveted between the respective sets of beams 32 and 33; said plates being provided with centrally located apertures 35ª and 36ª respectively for accommodating a king pin 38 for connection of a cradle or cross beam, as hereinafter described.

The respective boom sections 21 and 22 are pivotally supported on the shaft 23 by bearing plates 40 and 41, which are rigidly connected to the beams 25 and between each set of beams 32—33, respectively, as seen in Fig. 4. These bearing plates are maintained in proper spaced relation by tubular sleeves 42, 43 and 44 on said shaft.

The ends of said shaft extend through slots 46 formed in the web of the side channels of the auxiliary frame 19, and journaled on each end of said shaft are two rollers, 48 and 49, the former having rolling contact upon plates 50 secured beneath the side channels, while the latter rollers engage the inner surface of the lower flange of the channels. These rollers thus provide a longitudinally movable mounting for the pivot shaft 23, and the boom 20. To control such movement to assure proper position of the pivot shaft, I provide hand operated means which comprises a pair of split blocks 51, mounted on the ends of the shaft, just inwardly of the rollers 49, and connected to said blocks are longitudinally extending screws 52, which extend through threaded nuts 53, secured to a cross member 19ª of the auxiliary frame. Rigidly mounted on each screw, adjacent its free end is a sprocket wheel 55 around which are trained an endless link chain 56. The extreme ends of said screws are formed to receive an operating crank, so that upon operation of either screw, both are rotated simultaneously for moving the pivot shaft and boom forwardly or rearwardly on the chassis.

Figure 2:
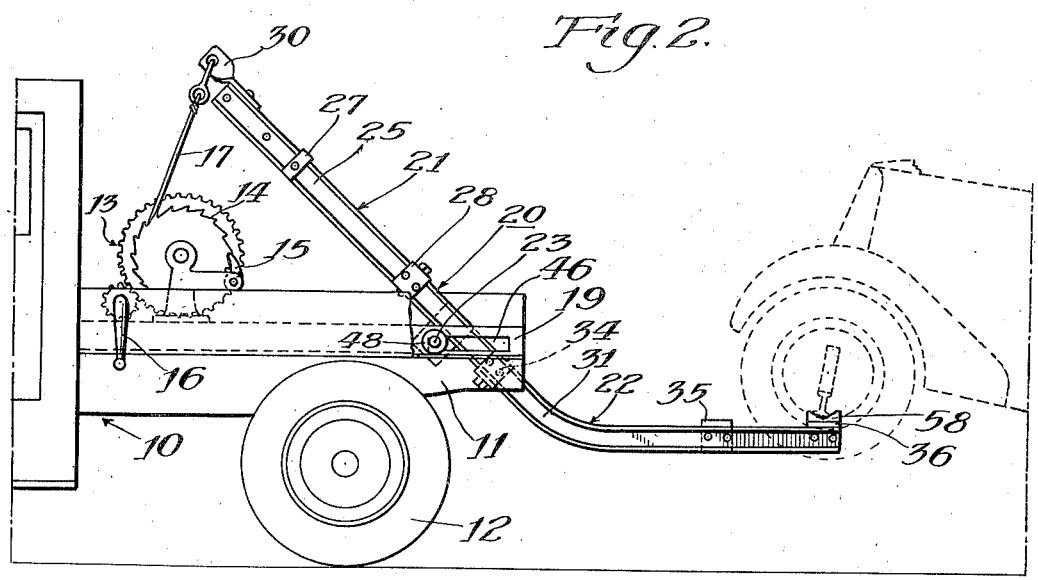
Fig. 2 is a view similar to Fig. 1, with the boom shown in raised position for supporting the front end of a vehicle to be towed.

When the apparatus is used the pivot shaft and boom preferably are at their rearwardmost position, and the lower end of the lower boom section 22 is projected beneath the end of the vehicle to be towed. Then by operation of the winch 13 the cable 17 is wound up, drawing the upper end of the boom down and simultaneously raising the lower end of the boom to assume the load of one end of the vehicle to be towed, as seen in Fig. 2. Then the adjusting screws 52 are rotated to move the pivot shaft 23 and boom 20 forwardly on the chassis of the towing vehicle 10, so that the assumed load is shifted closer to the axle of the rear wheel 12 of said vehicle. This prevents counterbalancing of the weight of the front end of the towing vehicle, and results in closer coupling of the towing and towed vehicles, and makes it convenient to raise and tow practically all types of automobiles without damaging parts thereof, and without imposing handicaps in steering the towing vehicle. When the pivot shaft and boom are moved forwardly the boom will naturally swing clockwise, with respect to the showing in Fig. 2, thus partially lowering the raised end of the towed vehicle. Therefore, if the raised end of the vehicle to be towed is lowered too much it may be necessary to raise it an additional amount. However, this may be compensated for initially if the raised end of the towed vehicle is elevated to a height slightly in excess of the desired travelling height.

When my improved towing apparatus is to be used for transporting a disabled vehicle by its front end, the lower end of the lower boom section 22, is provided with a suitable elongated cradle member 58 as seen in Figs. 5 to 7. This cradle may be of various forms and as shown is of channel shape having the web thereof bent upwardly at its ends, and provided with upwardly open wide V-shaped notches 59 to provide a seat for the front axle of the vehicle to be towed. As above mentioned, this cradle is pivotally connected to either of the plates 35 or 36 by a king pin 38 to provide free pivotal movement of the cradle to permit proper support for the front end of the towed vehicle in various articulated positions of the two vehicles. Whether the cradle is connected to plate 35 or plate 36 depends upon the construction and type of vehicle to be towed. In present-day passenger cars the front axle is located a substantial distance rearwardly of the forwardmost part of the car, hence the cradle for such cars is desirably connected to the plate 36 at the lower end of the boom. Although the cradle will provide a proper support and connection to the towed vehicle, it may be desirable for safety to wrap a chain or cable around the cradle and axle, or provide some other positive connection between the two vehicles.

When it is desirable or essential to tow a vehicle by its rear end, I employ a relatively long beam 60, which is connected to the lower end of the boom by the king pin 38, to permit it to swing in a generally horizontal direction to properly support the towed vehicle in normal articulated positions. As seen in Figs. 8 to 11 the beam 60 is formed of two channels 61 and 62, nested one in another with their flanges overlapping and spot welded together. The webs of these channels are formed at opposite ends of the beam with aligned elongated slots 63 through which extend hook bolts 64, which extend through and secure in place upstanding blocks 65. These slots permit adjustment of the blocks toward or away from each other to seat the particular vehicle to be towed. These blocks are of generally rectangular shape and each have their tops adjacent the inner edge cut away or otherwise formed to provide a seat 66 for receiving the pair of transversely spaced longitudinally extending leaf springs, provided on most all vehicles, when the beam and boom are moved beneath the rear end of the vehicle to be towed. This construction is particularly suitable for present car designs, as it permits the beam to be quickly and easily positioned beneath the vehicle to be towed. When the beam is in proper position with the blocks 65, seated under the springs, the hook end 64a of the bolts 61 is swung around, as seen in dotted lines in Fig. 9, to engage the top of the spring and thereby secure the blocks to the springs, with one face of the blocks abutting the inner side of the rear axle housing.

For certain types of automobiles provided with a single transverse leaf spring at the rear end, I reverse the blocks 65, end for end, as seen in Fig. 11, so that said blocks engage the inner side of the rear axle housing.

To insure safe connection between the two vehicles a chained cable may be wrapped around the beam 60 and the rear axle of the vehicle to be towed, or any other positive connection between the two vehicles may be employed.

When the towing apparatus is not in use, the lower boom section 22 may be folded upwardly about the pivot shaft 23, so as to be disposed substantially within the chassis of the vehicle 10, as seen in dotted outline in Fig. 1.

Although, I have shown and described a preferred embodiment of my invention, manifestly it is capable of modification and rearrangement without departing from the spirit and scope thereof. I do not, therefore, wish to be understood as limiting this invention to the precise form herein disclosed, except as I may be so limited in the appended claims.

I claim as my invention:

1. In a towing apparatus, the combination with a vehicle having a chassis, of a boom, means for pivotally supporting the boom on a transverse axis on the rear end of the chassis, said boom, in normal operating position, extending in a downwardly oblique rearward direction, said supporting means being movably mounted on the chassis and adapted to shift the pivot axis of the boom forwardly and rearwardly during operative engagement of said boom, and means for swinging said boom about its pivot support to raise the lower end thereof during operative engagement and rearward movement of said transverse axis.

2. In a towing apparatus, the combination with a vehicle having a chassis, of a boom, means for pivotally supporting the boom on a transverse axis on the rear end of the chassis, said boom, in normal operating position, extending in a downwardly oblique rearward direction, means for shifting the pivot supporting means longitudinally on the vehicle chassis during operative engagement of said boom, and means for swinging the boom about its pivot axis to raise the lower end thereof and to maintain it in its normal operating position after longitudinal shifting of said pivot.

3. In a towing apparatus, the combination with a vehicle having a chassis, of a boom, means associated with the chassis for pivotally supporting the boom, said boom, in normal operating position, extending in a downwardly oblique rearward direction, said means including a transversely extending pivot shaft, and rollers on the outer ends of said shaft in engagement with said chassis to provide a rolling support for the boom, means for moving the pivot supporting means longitudinally of the chassis to shift the pivot axis of the boom, and means for swinging the boom about its pivot axis to raise the lower end thereof.

4. In a towing apparatus, the combination with a vehicle having a chassis, of a boom, means associated with the chassis for pivotally supporting the boom, said boom, in normal operating position, extending in a downwardly oblique rearward direction, said means including a transversely extending pivot shaft, and rollers on the outer ends of said shaft in engagement with said chassis to provide a rolling support for the boom, means for moving the pivot supporting means longitudinally of the chassis to shift the pivot axis of the boom, said last mentioned means including a pair of longitudinally extending, transversely spaced apart screws connected to opposite ends of said shaft, and threaded nuts secured to the chassis, whereby rotation of the screws shifts the pivot shaft and boom forwardly or rearwardly on the chassis, and means for swinging the boom about its pivot axis to raise the lower end thereof.

5. In a towing apparatus, the combination with a vehicle having a chassis, of a boom, means associated with the chassis for pivotally supporting the boom, said boom, in normal operating position, extending in a downwardly oblique rearward direction, said means including a transversely extending pivot shaft, and rollers on the outer ends of said shaft in engagement with said chassis to provide a rolling support for the boom, means for moving the pivot supporting means longitudinally of the chassis to shift the pivot axis of the boom, said last mentioned means including a pair of longitudinally extending transversely spaced apart screws connected to opposite ends of said shaft, threaded nuts secured to the chassis, means interconnecting said screws for simultaneous rotation, whereby rotation of either screw moves the pivot shaft and boom forwardly or rearwardly on the chassis, and means for swinging the boom about its pivot axis to raise the lower end thereof.

6. In a towing apparatus, the combination with a vehicle having a chassis, of a boom formed of two main sections adapted to be interlocked together in operating position, means providing separate pivot supports on transverse axes for the respective boom sections on the rear end of the chassis, said boom sections in interlocked position normally extending in a downwardly oblique rearward direction, said means being constructed for longitudinal adjustment on the chassis for shifting the pivot axes and the boom sections forwardly or rearwardly on the chassis, and winch means on the chassis connected to the upper boom section adapted for swinging the upper boom section about its axis and thereby raising the lower boom section about its axis.

7. In a towing apparatus, the combination with a vehicle having a chassis, of a boom formed of two main sections adapted to be interlocked together in operating position, means providing separate pivot supports on transverse axes for the respective boom sections on the rear end of the chassis, said boom sections in interlocked position normally extending in a downwardly oblique rearward direction, said means being constructed for longitudinal adjustment on the chassis for shifting the pivot axes and the boom sections forwardly or rearwardly on the chassis, means for shifting the pivot supporting means forwardly or rearwardly on the chassis, and winch means on the chassis connected to the upper boom section adapted for swinging the upper boom section about its axis and thereby raising the lower boom section about its axis.

8. In a towing apparatus, the combination with a vehicle having a chassis, of a boom pivotally mounted on a transverse axis at the rear end of the chassis, said boom, in normal operating position, extending in a downwardly oblique rearward direction with its lower end adjacent the ground, means for swinging the boom about its pivot for raising the lower end thereof and means for moving said boom longitudinally of said vehicle, a transversely extending beam of substantial length pivotally mounted on the lower end of the boom for swinging in a generally horizontal plane, upstanding blocks mounted on the outer ends of the beam and formed to provide seats for longitudinally disposed leaf springs of a vehicle to be towed, and clamping means for securing the springs to said blocks.

9. In a towing apparatus, the combination with a vehicle having a chassis, of a boom pivotally mounted on a transverse axis at the rear end of the chassis, said boom, in normal operating position, extending in a downwardly oblique rearward direction with its lower end adjacent the ground, means for swinging the boom about its pivot for raising the lower end thereof, a transversely extending beam of substantial length pivotally mounted on the lower end of the boom for swinging in a generally horizontal plane, upstanding blocks detachably secured on the outer ends of the beam each having a portion of the upper end thereof formed to provide a seat for a longitudinally extending leaf spring of a vehicle to be towed, said blocks being reversible end for end for adapting the blocks for towing vehicles of different rear end construction, and means for detachably securing the springs to the blocks.

10. In a towing apparatus, the combination with a vehicle having a chassis, of a boom pivotally mounted on a transverse axis at the rear end of the chassis, said boom, in normal operating position, extending in a downwardly oblique rearward direction with its lower end adjacent the ground, means for swinging the boom about its pivot for raising the lower end thereof, a transversely extending beam of substantial length pivotally mounted on the lower end of the boom for swinging in a generally horizontal plane, upstanding blocks mounted on the outer ends of the beam and formed to provide seats for longitudinally disposed leaf springs of a vehicle to be towed, and clamping means for securing the springs to said blocks, said blocks being adjustable toward and from each other longitudinally of said beam for adapting the beam for towing vehicles of different rear end construction.

HECTOR TETRAULT.